Dec. 30, 1958  B. C. COOK ET AL  2,866,576
MACHINE FOR FEEDING WORK PIECES
Filed Dec. 23, 1955  5 Sheets-Sheet 1
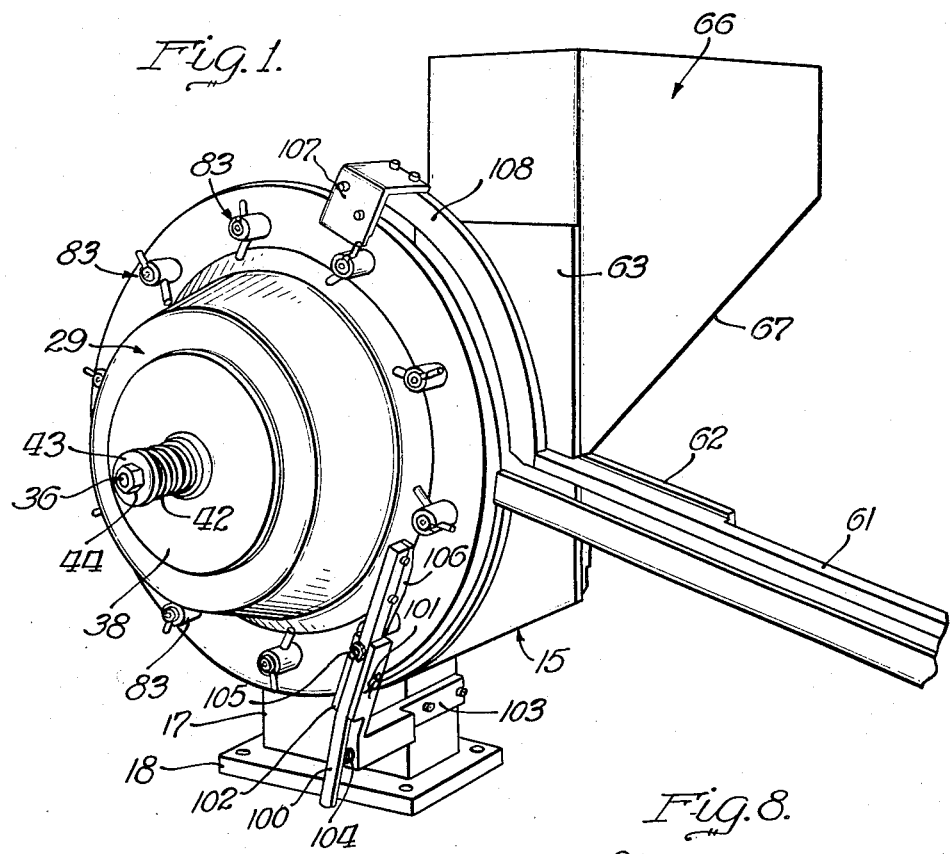
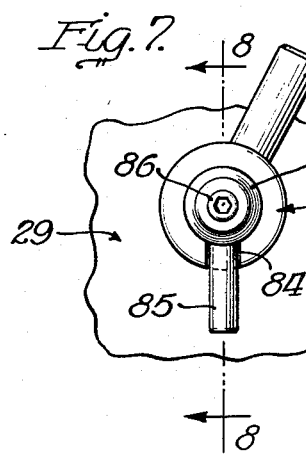
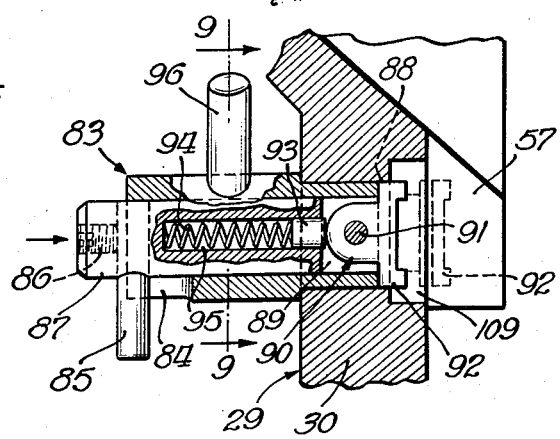
INVENTORS:
Bates C. Cook and
John Jokubonis
BY: Brown, Jackson, Boettcher & Dienner,
Attys.

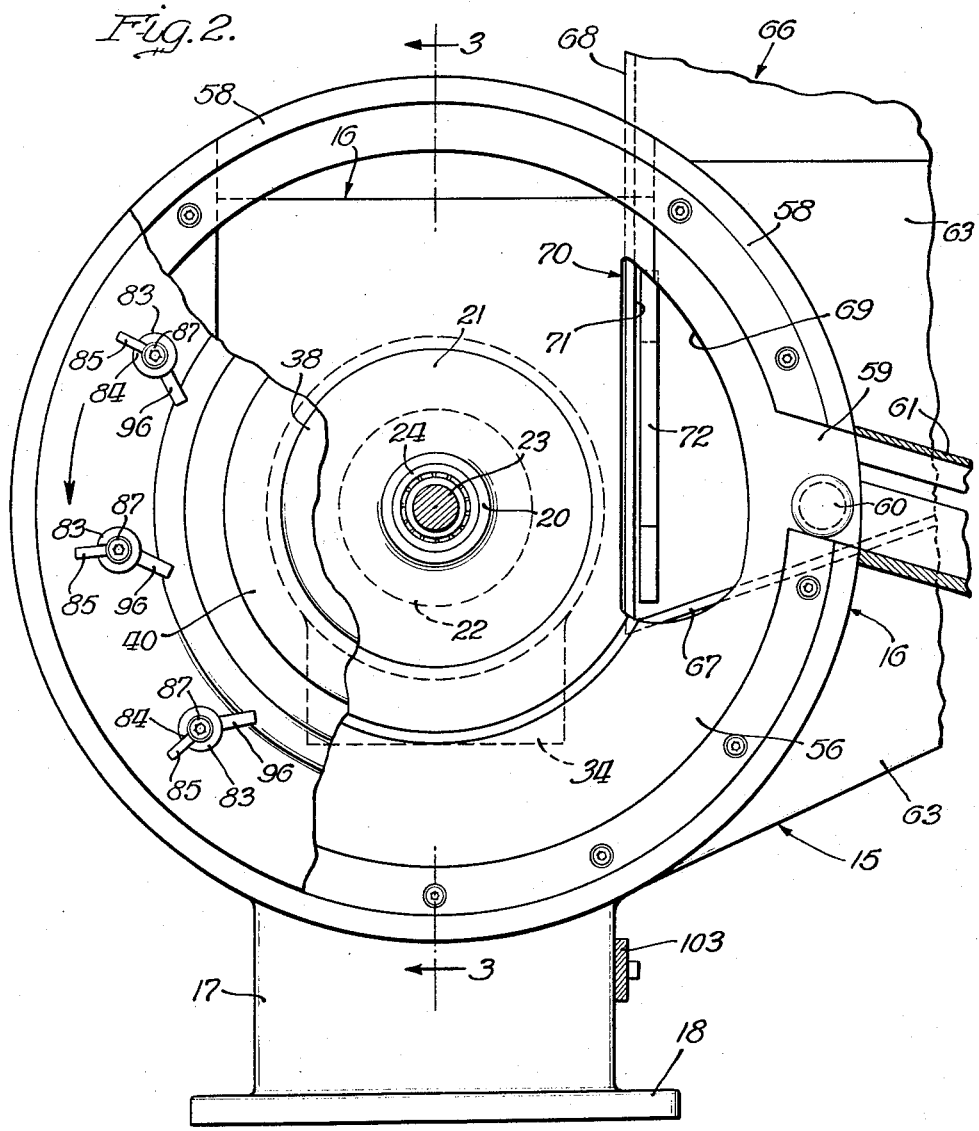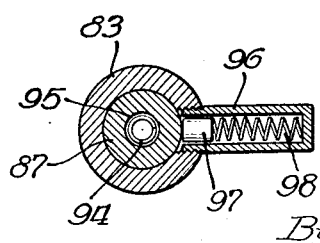

Dec. 30, 1958  B. C. COOK ET AL  2,866,576
MACHINE FOR FEEDING WORK PIECES
Filed Dec. 23, 1955  5 Sheets-Sheet 3
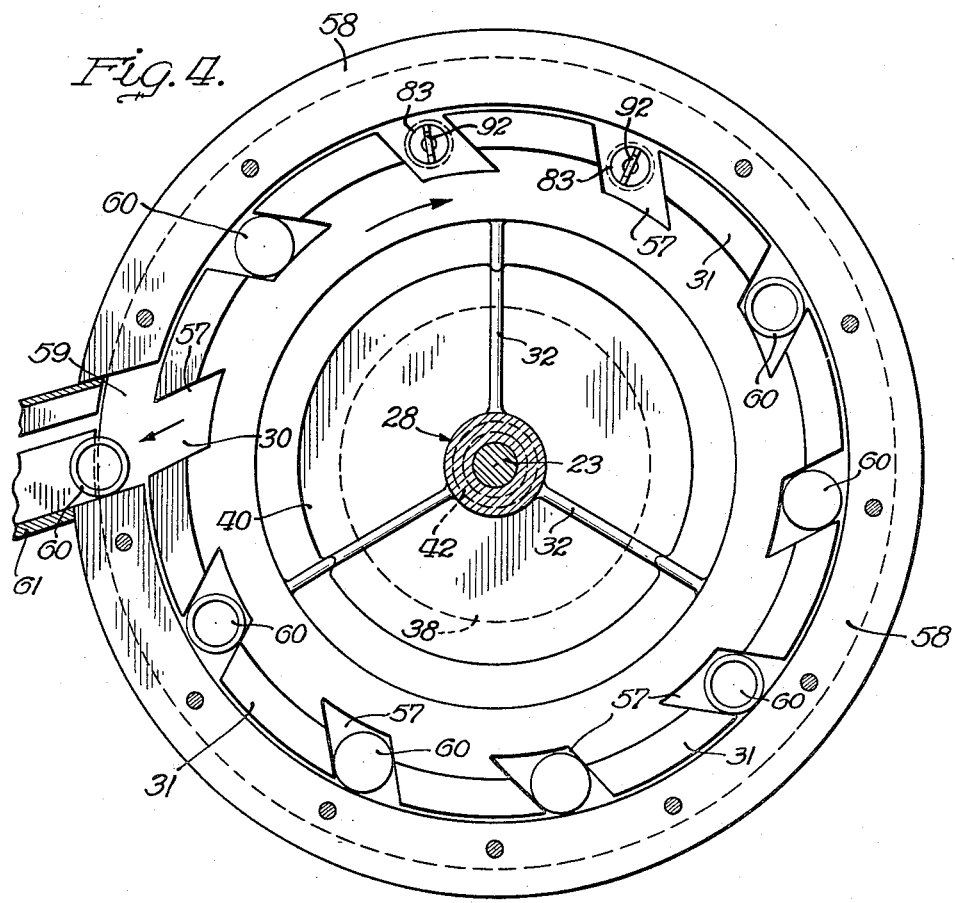
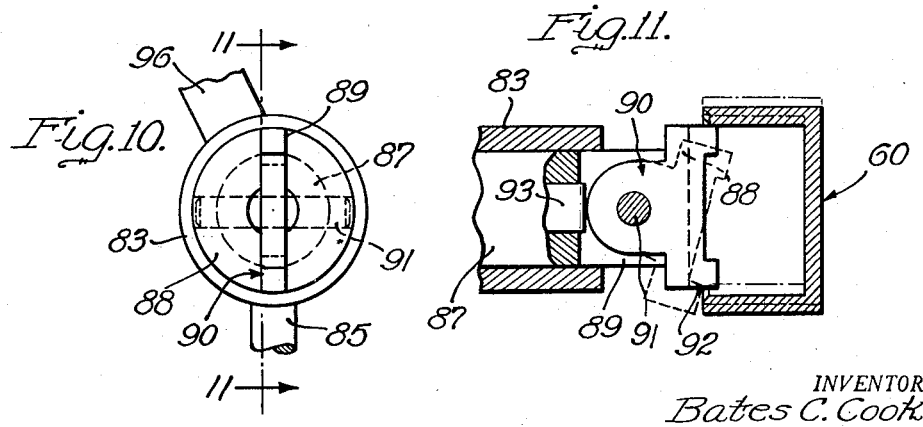
INVENTORS:
Bates C. Cook and
John Jokubonis

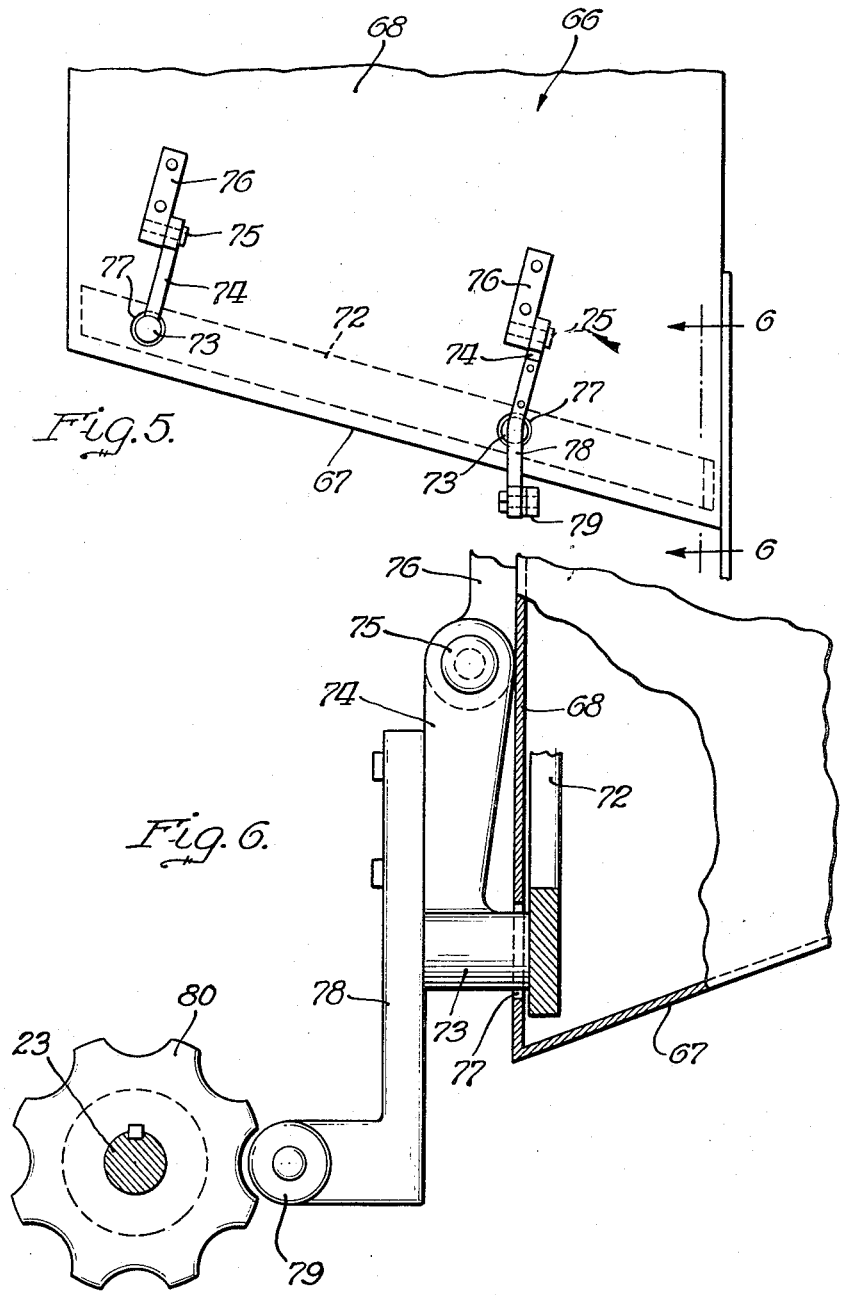

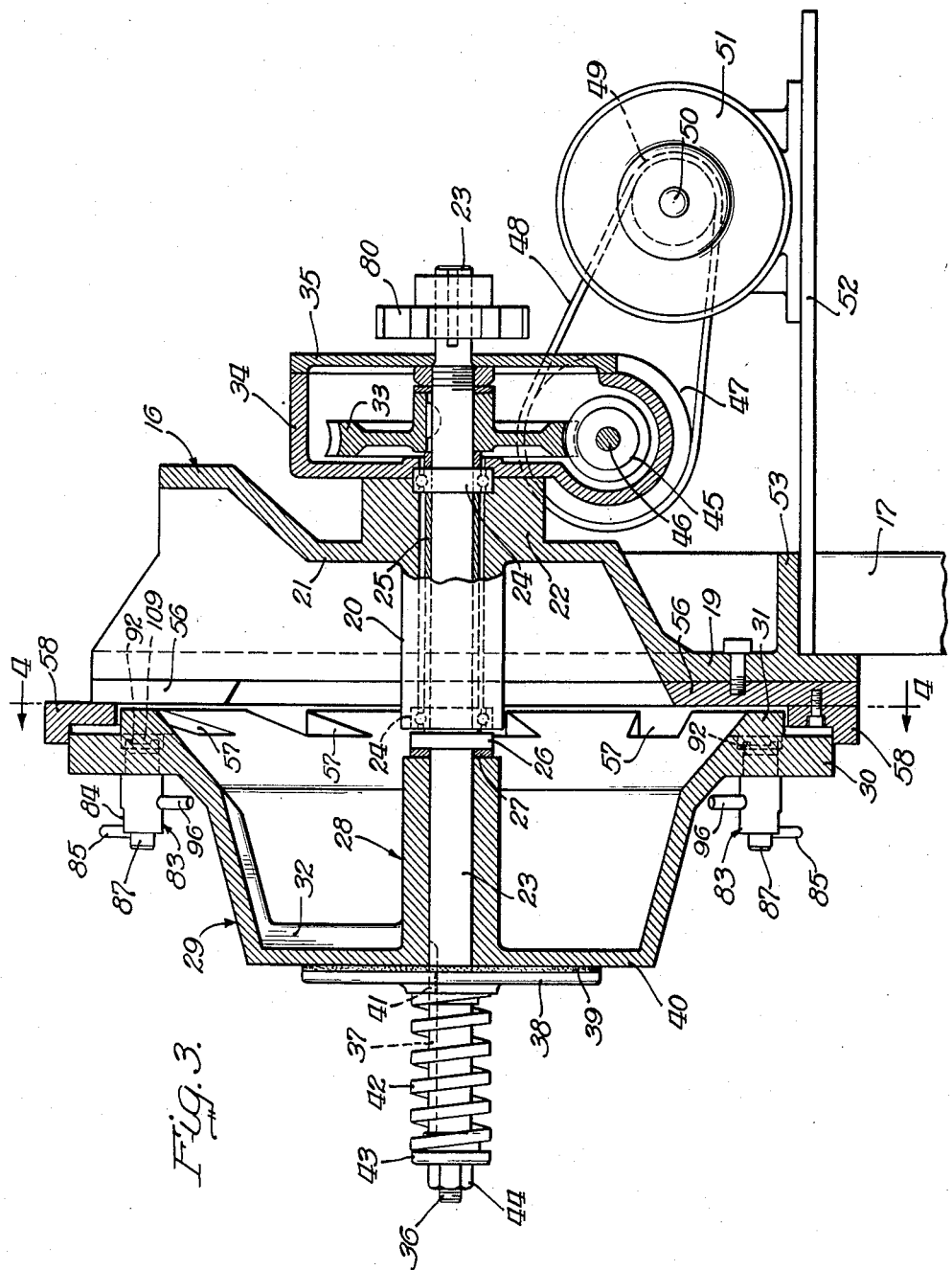

United States Patent Office 2,866,576
Patented Dec. 30, 1958

2,866,576

MACHINE FOR FEEDING WORK PIECES

Bates C. Cook and John Jokubonis, Chicago, Ill., assignors to Cook & Chick Company, Chicago, Ill., a corporation of Illinois Application December 23, 1955, Serial No. 555,032

8 Claims. (Cl. 221—156)

This invention relates to feeding machines, and has to do with machines for feeding small parts or work pieces to a station, such as a machine for performing a finishing operation on the work pieces.

In industrial operations it frequently is necessary to subject partially finished small parts or work pieces to grinding or other finishing operations. It is desirable, for practical reasons, that the handling of the work pieces be reduced to a minimum and that the work pieces be presented to the finishing machine, such as a grinding machine, for example, in predetermined position, particularly if the finishing operation is to be performed automatically or semi-automatically. Our invention is directed to a feeding machine in which the work pieces are properly positioned in respect to the grinder or other finishing machine so as to assure delivery thereto of the work pieces in position to be operated upon by the finishing machine. In the feeding machine of our invention only those work pieces which are properly positioned are discharged from that machine for delivery to the finishing machine and the improperly positioned work pieces in the feeding machine are retained therein and returned to the work piece receiving space or chamber thereof to be properly positioned and discharged for delivery to the finishing machine or station. To that end, our machine includes novel plunger means for retaining therein improperly positioned work pieces and returning them to the work piece receiving space or chamber of the machine. Further objects and advantages of our invention will appear from the detail description.

In the drawings:

Figure 1 is a perspective view of a feeding machine embodying our invention, the delivery chute being broken away;

Figure 2 is a front view, on an enlarged scale, of the machine of Figure 1, with the selector dial broken away in major portion and certain other parts broken away and shown in section;

Figure 3 is a sectional view taken substantially on line 3—3 of Figure 2, certain parts being shown in elevation;

Figure 4 is a sectional view taken substantially on line 4—4 of Figure 3;

Figure 5 is a fragmentary side view of the feed hopper and associated parts, on an enlarged scale;

Figure 6 is a sectional view, on an enlarged scale, taken substantially on line 6—6 of Figure 5, showing also the drive shaft and associated cam means for operating the agitator bar in the hopper;

Figure 7 is an outer end view, on an enlarged scale, of one of the work piece plunger retaining means, the selector dial being shown fragmentarily;

Figure 8 is a sectional view taken substantially on line 8—8 of Figure 7 certain parts being shown in elevation and certain other parts being partly broken away and shown in section;

Figure 9 is a sectional view of the plunger means taken substantially on line 9—9 of Figure 8;

Figure 10 is an inner end view, on an enlarged scale, of one of the plunger assemblies; and Figure 11 is a sectional view taken substantially on line 11—11 of Figure 10, of the inner end portion of the plunger assembly showing the plunger in its inner projected position with the rockably mounted work piece engaging member extending into the open end of a work piece.

The machine of our invention comprises a frame 15 carrying at its upper portion a hollow head 16 of substantially frusto-conical formation from which a neck 17 of substantially rectangular cross section extends downward and is provided at its lower end with an outwardly extending peripheral flange 18 for bolting to the upper end of a column or other suitable support (not shown). Head 16 is provided, at its forward base end with a circular outwardly extending radial flange 19. A sleeve 20 extends forwardly from the back wall 21 of head 16 centrally thereof and a tubular hub 22 extends rearwardly from wall 21 coaxially with sleeve 20.

A horizontally disposed counter shaft 23 is rotatably mounted in sleeve 20 and hub 22 by ball bearings 24 mounted in the forward end of sleeve 20 and the rearward end of hub 22, respectively, the inner races of the bearings 24 being spaced apart by a spacer 25 extending therebetween and mounted on the shaft 23. A collar 26 is suitably secured on shaft 23, conveniently by being shrunk thereon, at the forward end of sleeve 20. A fiber washer 27 is mounted on shaft 23 and seats against the forward face of collar 26. The inner or rearward end of tubular hub 28 of a selector dial 29 is held in pressure contact with the washer 27, by means to be described presently. The selector dial 29 is of substantially hollow frusto-conical formation, with its rearward or inner end base portion flaring outward radially and is provided with an outer radially extending circumferential flange 30 opposed to and parallel with the flange 19 of head 16. An annular rib 31 projects rearwardly beyond the rearward face of flange 30 concentric therewith and spaced radially inward a short distance from the circumference of flange 30. The radially inner face of rib 31 partakes of the flare of the inner or rearward base portion of dial 29 and is inclined radially outward thereof, as shown in Figure 3. Preferably dial 29 is provided with interior reinforcing ribs 32 at its outer or forward end portion. A worm wheel 33 is keyed on counter shaft 23 adjacent the rearward end of hub 22, within a gear housing 34 secured to hub 22 and provided with a removable cover plate 35. At its outer or forward end the shaft 23 is of reduced diameter and threaded to provide a screw stud 36. Shaft 23 is further provided, in its forward portion, with a lengthwise groove or keyway 37 extending from the shoulder at the inner or rearward end of stud 36. A pressure disc 38 is slidably mounted on shaft 23 and seats against the outer face of a friction disc 39, also slidable on shaft 23 and seating on the outer face of the forward or outer end wall 40 of dial 29. The disc 30 is provided with a boss or key element 41 which engages in the keyway 37. The pressure disc 38 is thus feathered on shaft 23 for rotation therewith. A compression spring 42 is mounted about the forward portion of shaft 23 and is confined between pressure disc 38 and a flanged thimble 43 slidable on shaft 23 and restrained against outward movement by a nut 44 screwed onto the stud 36. The pressure disc 38 provides in conjunction with friction disc 39 and associated parts a friction drive between the shaft 23 and selector dial 29 effective for normally rotating the latter with shaft 23 while permitting slippage in the event of excessive resistance to rotation of dial 29 being encountered. The worm wheel 33 meshes with the worm 45 secured on a drive shaft 46 rotatably mounted in the lower portion of the gear housing 34. A pulley 47, preferably a V-pulley, is secured on shaft 46 and receives a belt 48 passing about a pulley 49 secured on shaft 50 of an electric motor 51 mounted on a plate 52 secured to and extending rearwardly from a flange 53 integral with and extending rearward from head 16. As will be understood from what has been said, when the motor 51 is in operation, the counter shaft 23 is driven and the selector dial 29 rotates therewith.

A face plate 56 of approximately U-shape is suitably secured, conveniently by bolting, to flange 19 of head 16. The lower portion of face plate 56 extends about the recess or space within the head 16 flush therewith and is inclined similarly thereto, as will be clear from Figures 2 and 3, and the outer periphery of face plate 56 corresponds to the outer periphery of head 16. The rib 31 extends inward or rearwardly from dial 29 and is disposed in close proximity to the forward or outer face of the face plate 56, as shown in Figure 3. Rib 31 is provided with a plurality of uniformly spaced slots disposed generally radially of dial 29 and open at their radially inner and outer ends, providing recesses 57 opening axially of dial 29 toward the face plate 56. Each of the recesses 57 is of proper size and shape to receive one of the work pieces, as will appear more fully later. A retainer ring 58, of angle cross section, is suitably secured, conveniently by bolting, to the outer or forward face of face plate 56 concentric with and in close proximity to the radially outer face of rib 31, ring 58 preferably extending outwardly a short distance about the flange 30, as shown in Figure 3. The recesses 57 preferably are inclined transversely of rib 31, as shown more clearly in Figure 4 and the retainer ring 58 is provided with an opening 59 at the up travel side thereof so disposed that when a recess 57 reaches the opening 59, in the rotation of dial 29 in clockwise direction, as indicated by the arrow in Figure 4—in counterclockwise direction as viewed in Figure 2, as indicated by the arrow—a work piece 60 will be discharged from the recess 57 and will pass through the opening 59 into an inclined chute 61 extending downward from opening 59. The chute 61 is mounted, at the end thereof adjacent head 16, on a bracket 62 secured to a back plate 63 of frame 15. The chute 61 leads to a station, such as a grinding machine, to which the work pieces are to be delivered in predetermined position and is of proper interior size and shape to assure that the work pieces delivered to the chute from the recesses 57 will be retained in the position in which they are discharged from the recesses.

As will be clear from Figure 3, the head 16 and the selector dial 19 define between them a chamber or space for reception of the work pieces, the lower portion of which is inclined downward toward the recesses 57 at the lower portion of dial 29 for directing the work pieces to the recesses. An open topped hopper 66, the forward wall of which may be formed in part by the plate 63, is mounted on frame 15 to one side—the right hand side as viewed in Figures 1 and 2—of the shaft 23. The bottom wall 67 of hopper 66 is inclined downwardly and forwardly toward frame 15 and is also inclined downwardly and inwardly toward the inner side wall 68 of hopper 66, as will be clear from Figures 1 and 2. The face plate 56 is provided with a substantially arcuate cutout or recess 69 extending from the inner edge of its right hand arm as viewed in Figure 2 and spaced inwardly from the retainer ring 58. The head 16 is provided with an opening 70 corresponding to and substantially in register with the recess or notch 69 in face plate 56 and the front wall of hopper 66 is also provided with an opening at the lower inner portion of its front wall substantially corresponding to and aligned with the opening 70 in head 16, such hopper opening being designated 71. It will be seen that work pieces placed in the hopper 66 may readily pass therefrom through the opening 70 in head 16 and the notch 69 in face plate 56 and thence into the interior of head 16. In order to assure delivery of the work pieces from the hopper to the interior of head 16, an agitator bar 72 is mounted within hopper 66 adjacent and parallel with the inner side wall 68 thereof and a short distance above the bottom wall 67. Referring to Figures 5 and 6, the agitator bar is secured to the inner ends of two studs 73 spaced apart a substantial distance lengthwise thereof. Each of the studs 73 is carried at the lower end of an arm 74 pivoted at its upper end, at 75, to a bracket 76 secured to the inner side wall 68 of hopper 66. Each of the studs 73 passes through an opening 77 in hopper wall 68 of appropriate size to permit of swinging movement of the studs 73 with the arms 74. An angle arm 78 is rigidly secured, conveniently by bolting, to the forward one of the arms 74 and extends downward therefrom. Angle arm 78 carries a roller 79 disposed to be contacted by a toothed cam wheel 80 secured on the rearward end of shaft 23, as shown more clearly in Figure 3, adjacent the gear housing 34. When the shaft 23 is driven for rotating the selector dial 29 counterclockwise as viewed in Figures 1 and 2, the arm 78 will be oscillated by the cam wheel 80 thereby oscillating the bar 72 effective for agitating the work pieces in the hopper 66 so as to assure ready flow thereof into the interior of head 16, as above explained. It will be seen that the motor 51 drives both the selector dial 29 and the means for operating the agitator bar 72.

It is important that the work pieces being delivered to the grinding machine or other station be properly positioned and, in order to assure that, we provide means whereby work pieces which are improperly positioned in the recesses 57 of the selector dial 29 will not be delivered to the chute 61. To that end, the dial 29 has secured therein a plurality of bushings 83 respectively aligned with the recesses 57 and extending forwardly from dial 29 substantially perpendicular thereto. The rearward or inner end portion of each bushing 83 is reduced in diameter, as shown more clearly in Figure 8, to provide a shoulder which seats against the outer face of dial 29, the reduced inner or rearward end portion of bushing 83 being secured in a corresponding bore in the dial by suitable means, as by a push fit therein. Bushing 83 is provided with a lengthwise slot 84 extending from its outer or forward end and slidably receiving a pin 85 secured by a set screw 86 in a plunger 87 slidable in bushing 83, pin 85 extending radially from plunger 87. The plunger 87 is movable inwardly or rearwardly through bushing 83 to an inner projected position and is movable outwardly to an outer retracted position, the slot 84 being of such length that the pin 85 is located in slot 84 in either of the extreme positions of the plunger. Pin 85 thus acts, in cooperation with slot 84, to restrain the plunger 87 against turning movement relative to bushing 83 and also limits the inward movement of plunger 87 to its inner projected position. The plunger 87 is provided at its inner end with a circumferential flange 88, shown more clearly in Figure 10, disposed to contact the inner end of bushing 83 and limit outward movement of plunger 87. Plunger 87 is further provided with a diametrical slot 89 extending from its inner end and substantially parallel with the pin 85. A work piece engaging member 90 is pivotally mounted in slot 89 by a pivot pin 91 inserted through plunger 87 perpendicular to pin 85. The member 90 is provided at its rearward or inner end with a head 92 of substantially shallow U-shape providing two spaced fingers, one at each end of head 92, for engagement with the work piece, as will appear more fully later.

A cylindrical pressure block 93 is slidably mounted in an axial bore in plunger 87 extending from the outer end of slot 89 and is held in pressure contact with the outer end of member 90 by a compression spring 94 mounted in bore 95 and confined between the outer end thereof and block 93. The pressure contact between block 93 and member 91 is effective for resisting free turning movement of the latter and for holding it in any one of various positions which it may assume. That is desirable for reasons which will appear more fully presently. It is also desirable that a drag be imposed upon the plunger 87 for retaining it in its projected position and its retracted position. To that end, a tubular pin 96, closed at its outer end and open at its inner end, is threaded into bushing 83 radially thereof and carries a cylindrical pressure block 97, as shown in Figure 9, held in pressure contact with plunger 87 by a compression spring 98 disposed within pin 96 and confined between the outer end thereof and block 97.

As will be noted from Figures 1 and 2, the plungers 87 are so disposed that the pins 85 thereof extend outward radially of selector dial 29 and the pins 96 extend radially inward of dial 29, the bushings 83 being appropriately disposed to that end. Each of the plungers 87 normally is in its forward retracted position, in which it extends outwardly a substantial distance beyond the outer end of bushing 83, as shown in Figures 3 and 8. A lever 100 is pivoted at about its midlength, at 101, in a channel member 102 of a bracket 103 suitably mounted, conveniently by bolting, on neck 17 of frame 15. Lever 100 is urged in clockwise direction about its pivot 101 by a compression spring 104 confined between the lower portion of lever 100 and the forward portion of bracket 103. Turning movement of lever 100 clockwise is limited by an adjustable stop, such as a screw 105, carried by lever 100 and disposed to contact the base of channel 102. A rounded cam 106 is carried by the upper arm of lever 100 and is disposed to contact the outer or forward ends of plungers 87 at the lower right hand portion of selector dial 29, as viewed in Figure 1, during rotation thereof in counterclockwise direction. The lever 100 and associated parts provide yielding cam means for successively projecting the plungers 87 corresponding to recesses 57 containing improperly positioned work pieces 60 while permitting the plungers 87 corresponding to recesses 57 containing properly positioned work piece to remain in their outer retracted positions, the cam 106 moving outward for that purpose as permitted by the compression spring 104.

In Figures 4 and 11 we have shown the work pieces as being in the form of a cylindrical cap 60 closed at one end and open at its other end. It is assumed, for purposes of description, that the work pieces 60 should be delivered to the chute 61 with the open ends thereof directed rearwardly and, accordingly, should be positioned in the recesses 57 of dial 29 with closed ends toward the dial and their open ends toward head 16, in order to be delivered in proper position to the chute 61. In the operation of the machine the work pieces are delivered from the hopper 66 to the interior of head 16 and are directed downward toward the recesses 57 so as to enter the latter through the radially inner ends thereof, i. e., the upper ends of the recesses at the lower portion of the dial 29. The dial 29 is rotated in counterclockwise direction, as viewed in Figures 1 and 2, and the cam 106 is disposed at the lower right hand portion of selector dial 29, as shown in Figure 1. Certain of the work pieces will enter the recesses so as to be properly positioned therein while other work pieces may be improperly positoned in other recesses, with their open ends directed toward the dial 29, as shown in Figure 4. When a plunger 87 passes across the cam 106, if the work piece is properly positioned in the corresponding recess the plunger may be moved inward or rearward a short distance until the head of member 90 contacts the closed end of the work piece 60, which prevents further inward movement of plunger 87, the inner open end of the work piece then contacting the face plate 56. The cam 106 yields outwardly in the continued travel of the dial 29 and plunger 87 then passes upward beyond cam 106 until the recess reaches the opening 59 in the retainer ring 58, at which point the work piece is discharged and delivered to the chute 61. During rotation of the dial 29 the work pieces in the recesses 57 at the lower portion of the dial 29 are retained therein by the ring 58 along which they slide or roll in the continued travel of the dial. If a work piece is improperly positioned in one of the recesses 57, with its open end presented to the dial 29, the corresponding plunger 87 is moved inward by the cam 106 to such an extent that the member 90 enters the open end of the work piece so as to prevent discharge thereof at the opening 59. The improperly positioned work piece is thereby retained in the corresponding recess 57 and passes upward beyond the discharge opening 59 to a point adjacent the top of dial 29, at which point pin 85 contacts a cam plate 107 carried by an arcuate member 108 suitably secured, conveniently by bolting, to plate 63. The cam plate 107 in cooperation with pin 85 moves plunger 87 outward to its fully retracted position clear of the work piece in the recess 57, thus releasing the work piece which then drops downward through the radially inner end—then the lower end—of the recess 57 into the chamber or space between head 16 and selector dial 29. The work piece then eventually finds its way into one of the recesses in proper position therein and is discharged through the opening 59 in the manner previously described.

Referring further to Figures 8 and 11, dial 29 is provided contiguous to each recess 57 thereof, with a shallow pocket 109 concentric with the rearward or inner end of bushing 83 and of a depth to accommodate the head 92 of member 90. In the retracted position of plunger 87 member 92 is positioned within the pocket 109 so as to be clear of a work piece disposed in the recess 57. In general, the work piece 60 in the recess 57 will be disposed in substantially concentric relation to the plunger 87 so that when the plunger is projected the work piece engaging head 92 will enter the open end of an improperly positioned work piece 60, as shown in Figure 11. In the event the work piece 60 is improperly positioned in the recess 57 and is appreciably off center relative to the plunger 87, one of the fingers of head 92 of member 90 will contact the end of the circumferential wall of work piece 60 and member 90 will then turn about its pivot pin 91 into position extending into the work piece 60, as indicated by the dot and dash line positions of the member 90 and of work piece 60, so as to retain the improperly positioned work piece 60 in the recess 57 until it is released by movement of the plunger 87 outward to its retracted position, as above described. Incident to such outward movement of the plunger 87 the member 90 is turned to its normal position by contact thereof with the inner end of bushing 83.

For purposes of description, the work piece 60 has been shown as a cylindrical cap closed at one end and open at its other end. It is to be understood that the work piece may be of any suitable form provided it is adapted for cooperation with the plunger means so as to be retained thereby in the recess 57 if the work piece is improperly positioned therein. It will be understood that changes in detail may be resorted to without departing from the field and scope of our invention, and we intend to include all such variations, as fall within the scope of the appended claims, in this application in which the preferred form only of our invention has been disclosed.

We claim:

1. In plunger means for a work piece feeder, a bushing, a plunger slidable in said bushing movable to a retracted position extending beyond one end of said bushing and to a projected position extending beyond the other end of said bushing, a radial pin secured in said plunger, said bushing having a lengthwise slot receiving said pin in either position of said plunger and in cooperation with said pin restraining said plunger against turning movement relative to said bushing and limiting movement of said plunger toward projected position, means carried by said bushing having pressure contact with said plunger resisting movement thereof in either direction, a work piece engaging member pivoted on one end of said plunger for rocking movement about an axis substantially perpendicular to said pin, and means carried by said plunger having pressure contact with said member resisting rocking thereof in either direction.

2. In a machine for feeding to a station work pieces in predetermined position, said machine comprising a selector dial mounted for rotation about a substantially horizontal axis and provided with substantially radial recesses closed at their axially outer sides and open at their radially inner and outer ends and adapted to receive individual work pieces, means for rotating said dial in one direction, means for delivering work pieces to said recesses at the radially inner ends thereof, and retaining means closing the axially inner sides and radially outer ends of said recesses effective for retaining work pieces therein, said retaining means having an opening at the up travel side of said dial disposed for discharge of the work pieces from said recesses; plungers slidably mounted on said dial substantially perpendicular thereto and individual to and aligned with said recesses thereof and normally in their retracted outer positions, a work piece engaging member mounted on the inner end of the respective plungers for movement about an axis extending transversely of the corresponding recess and tiltable by contact with a work piece to position to enter a work piece improperly positioned in the corresponding recess and having an open end presented toward said dial, means in advance of said discharge opening for yieldingly urging said plungers inwardly to projected position with said members extending into the open ends of improperly positioned work pieces, and means beyond said discharge opening for returning said plungers to their normal retracted outer position.

3. In a machine for feeding to a station work pieces in predetermined position, said machine comprising a selector dial mounted for rotation about a substantially horizontal axis and provided with substantially radial recesses closed at their axially outer sides and open at their radially inner and outer ends and adapted to receive individual work pieces, means for rotating said dial in one direction, means for delivering work pieces to said recesses at the radially inner ends thereof, and retaining means closing the axial inner sides and radially outer ends of said recesses effective for retaining work pieces therein, said retaining means having an opening at the up travel side of said dial disposed for discharge of the work pieces from said recesses; plungers slidably mounted on said dial substantially perpendicular thereto and individual to and aligned with said recesses thereof and normally in their retracted outer positions, a work piece engaging member pivoted in the inner end of the respective plungers for movement about an axis extending diametrically of said plunger and tiltable by contact with a work piece to position to enter into a work piece improperly positioned in the corresponding recess and having an open end presented toward said dial, means in advance of said discharge opening for yieldingly urging said plungers inwardly to projected position with said members extending into the open ends of improperly positioned work pieces, and means beyond said discharge opening for returning said plungers to their normal retracted outer position.

4. In a machine for feeding to a station work pieces in predetermined position, said machine comprising a selector dial mounted for rotation about a substantially horizontal axis and provided with substantially radial recesses closed at their axially outer sides and open at their radially inner and outer ends and adapted to receive individual work pieces, means for rotating said dial in one direction, means for delivering work pieces to said recesses at the radially inner ends thereof, and retaining means closing the axially inner sides and radially outer ends of said recesses effective for retaining work pieces therein, said retaining means having an opening at the up travel side of said dial disposed for discharge of the work pieces from said recesses; plungers slidably mounted on said dial substantially perpendicular thereto and individual to and aligned with said recesses thereof and normally in their retracted outer positions, a work piece engaging member pivoted in the inner end of the respective plungers for movement about an axis extending diametrically of said plunger, means yieldingly resisting tilting of said member effective for retaining it in a tilted position, said engaging member being tiltable by contact with a work piece to a position to enter into a work piece improperly positioned in the corresponding recess and having an open end presented toward said dial, means in advance of said discharge opening for yieldingly urging said plungers inwardly to projected position with said members extending into the open ends of improperly positioned work pieces, and means beyond said discharge opening for returning said plungers to their normal retracted outer position.

5. In a machine for feeding to a station work pieces in predetermined position, said machine comprising a selector dial mounted for rotation about a substantially horizontal axis and provided with substantially radial recesses closed at their axially outer sides and open at their radially inner and outer ends and adapted to receive individual work pieces, means for rotating said dial in one direction, means for delivering work pieces to said recesses at the radially inner ends thereof, and retaining means for retaining closing the axially inner sides and radially outer ends of said recesses effective work pieces therein, said retaining means having an opening at the up travel side of said dial disposed for discharge of the work pieces from said recesses; plungers slidably mounted on said dial substantially perpendicular thereto and individual to and aligned with said recesses thereof and normally in their retracted outer positions, a work piece engaging member pivoted in the inner end of the respective plungers for tilting movement about an axis extending diametrically of said plunger, said engaging member extending diametrically of and beyond said plunger and being tiltable by contact with a work piece to position to enter into a work piece improperly positioned in the corresponding recess and having an open end presented toward said dial, means in advance of said discharge opening for yieldingly urging said plungers inwardly to projected position with said members extending into the open ends of improperly positioned work pieces, and means beyond said discharge opening for returning said plungers to their normal retracted outer position.

6. In a machine for feeding to a station work pieces in predetermined position, said machine comprising a selector dial mounted for rotation about a substantially horizontal axis and provided with substantially radial recesses closed at their axially outer sides and open at their radially inner and outer ends and adapted to receive individual work pieces, means for rotating said dial in one direction, means for delivering work pieces to said recesses at the radially inner ends thereof, and retaining means closing the axially inner sides and the radially outer ends of said recesses effective for retaining work pieces therein, said retaining means having an opening at the up travel side of said dial disposed for discharge of the work pieces from said recesses; plungers slidably mounted on said dial substantially perpendicular thereto and individual to and aligned with said recesses thereof and normally in their retracted outer positions, a work piece engaging member pivoted in the inner end of the respective plungers for tilting movement about an axis extending diametrically of said plunger, said engaging member extending diametrically of said plunger and beyond the latter at opposite sides thereof and being tiltable by contact with a work piece to position to enter into a work piece improperly positioned in the corresponding recess and having an open end presented toward said dial, means in advance of said discharge opening for yieldingly urging said plungers inwardly to projected position with said members extending into the open ends of improperly positioned work pieces, and means beyond said discharge opening for returning said plungers to their normal retracted outer position.

7. In a machine for feeding to a station work pieces in predetermined position, said machine comprising a selector dial mounted for rotation about a substantially horizontal axis and provided with substantially radial recesses closed at their axially outer sides and open at their radially inner and outer ends and adapted to receive individual work pieces, means for rotating said dial in one direction, means for delivering work pieces to said recesses at the radially inner ends thereof, and retaining means closing the axially inner sides and radially outer ends of said recesses effective for retaining work pieces therein, said retaining means having an opening at the up travel side of said dial disposed for discharge of the work pieces from said recesses; plungers slidably mounted on said dial substantially perpendicular thereto and individual to and aligned with said recesses thereof and normally in their retracted outer positions, a work piece engaging member pivoted in the inner end of the respective plungers for tilting movement about an axis extending diametrically of said plunger, said engaging member extending diametrically of and beyond said plunger and being tiltable by contact with a work piece to position to enter into a work piece improperly positioned in the corresponding recess and having an open end presented toward said dial, means in advance of said discharge opening for yieldingly urging said plungers inwardly to projected position with said members extending into the open ends of improperly positioned work pieces, means beyond said discharge opening for returning said plungers to their normal retracted outer position, and means for returning said member from a tilted position to a normal position substantially diametric of said plunger incident to return of the latter to its normal retracted position.

8. In a machine for feeding to a station work pieces in predetermined position, said machine comprising a selector dial mounted for rotation about a substantially horizontal axis and provided with substantially radial recesses closed at their axially outer sides and open at their radially inner and outer ends and adapted to receive individual work pieces, means for rotating said dial in one direction, means for delivering work pieces to said recesses at the radially inner ends thereof, and retaining means closing the axially inner sides and radially outer ends of said recesses effective for retaining work pieces therein, said retaining means having an opening at the up travel side of said dial disposed for discharge of the work pieces from said recesses; bushings secured in said dial substantially perpendicular thereto and aligned with the respective recesses thereof, said dial having pockets opening into said recesses substantially concentric with said bushings and bores receiving said bushings extending inwardly therebeyond to said pockets, plungers slidably mounted in said bushings substantially perpendicular to said dial and normally in their outer retracted positions, work piece engaging members pivoted in the inner end of the respective plungers for tilting movement about an axis extending diametrically of said plunger, said member normally extending diametrically of said plunger and therebeyond at opposite sides thereof within the diameter of the corresponding one of said bores, said member being tiltable by contact with a work piece to position to enter into a work piece improperly positioned in the corresponding recess and having an open end presented toward said dial, means yieldingly resisting tilting movement of said member, means in advance of said discharge opening for yieldingly urging said plungers inwardly to projected position, and means beyond said discharge opening for returning said plungers to their normal retracted outer position, the inner end of the respective bushings being disposed to be contacted by the work piece engaging member effective for returning the latter to its normal position in the outward movement of the plunger to its normal retracted position.

References Cited in the file of this patent

UNITED STATES PATENTS

| | | |
|---|---|---|
| 573,745 | Wilson | Dec. 22, 1896 |
| 711,306 | Good | Oct. 14, 1902 |
| 1,696,549 | Maguth | Dec. 25, 1928 |
| 1,929,539 | Steuernagel | Oct. 10, 1933 |
| 2,116,001 | Schlage | May 3, 1938 |
| 2,157,013 | Pommer | May 2, 1939 |
| 2,292,864 | Bidwell | Aug. 11, 1942 |
| 2,639,034 | Roeber | May 19, 1953 |
| 2,757,822 | Cox | Aug. 7, 1956 |